(12) United States Patent
Ong et al.

(10) Patent No.: US 6,550,678 B1
(45) Date of Patent: Apr. 22, 2003

(54) HIGH CAPACITY CARD AND READER SYSTEM

(75) Inventors: Albert Ong, Temecula, CA (US); Mark Burkhart, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 137 days.

(21) Appl. No.: 09/590,606

(22) Filed: Jun. 9, 2000

Related U.S. Application Data

(60) Provisional application No. 60/207,603, filed on May 26, 2000.

(51) Int. Cl.[7] .................................................. G06K 7/10
(52) U.S. Cl. ..................... 235/454; 235/459; 235/435; 235/462.32; 235/462.33; 235/462.38
(58) Field of Search ............................. 235/454, 459, 235/435, 462.32, 462.33, 462.38

(56) References Cited

U.S. PATENT DOCUMENTS

| | | | | |
|---|---|---|---|---|
| 3,819,910 A | * | 6/1974 | Scatlin | 235/61.11 |
| 4,263,504 A | * | 4/1981 | Thomas | 235/454 |
| 4,536,648 A | * | 8/1985 | Kruse et al. | 235/454 |
| 4,680,456 A | * | 7/1987 | Drexler | 235/454 |
| 5,059,774 A | * | 10/1991 | Kubo et al. | 235/454 |
| 5,448,048 A | * | 9/1995 | Oshiba | 235/454 |
| 5,742,420 A | * | 4/1998 | Peng | 359/201 |
| 6,311,893 B1 | * | 11/2001 | Liu et al. | 235/454 |
| 6,318,633 B1 | * | 11/2001 | Drexler | 235/454 |

FOREIGN PATENT DOCUMENTS

| | | | | |
|---|---|---|---|---|
| JP | 406176406 A | * | 6/1994 | G11B/7/24 |
| JP | 02001006226 A | * | 1/2001 | G11B/7/24 |

* cited by examiner

*Primary Examiner*—Karl D. Frech
*Assistant Examiner*—Daniel A. Hess
(74) *Attorney, Agent, or Firm*—Louis J. Bachand

(57) ABSTRACT

Optical data card and reader system for recording data in which the card has approximately the dimensions of a credit card, the card having a laser readable layer comprising plural tracks of light-detectable indicia arranged in an angular or X-Y grid, and a laser reader therefor being adapted to scan the tracks by relative angular or X-Y movement between the laser and the card.

2 Claims, 3 Drawing Sheets

HIGH CAPACITY CARD AND READER SYSTEM

CROSS-REFERENCE TO RELATED APPLICATIONS

This application claims the benefit of United States provisional Application Serial No. 60/207,603 filed May 26, 2000.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to improved personal or industrial credit-card sized data storage and retrieval systems, and more particularly to a system in which the data is recorded and read optically.

2. Description of the Related Art

Typical credit and debit cards have a magnetized strip on one side that contains individualized information, such as the cardholders account number, identity data, and possibly an account balance and other information useful for the transactions to be performed with the card. Magnetic strips read by conventional card readers are limited in information-storing capacity to about 1kilobyte, or less than one page of text. Limited storage capacity bars use of the conventional credit card magnetic strip for storage of large amounts of data such as medical records, including X-rays, medicine dosages and allergy histories, and anti-forgery and fraud personal identifiers such as digitized signatures, photo identifications, and country or building exit and entry records.

More recently, hard disk drive technology (HDD) has been adapted to card reading. Use of a different type of recording head enables writing magnetic data over a larger portion of the card disk, and at a higher density so that several megabytes of data can be stored and retrieved using circular or X-Y raster formats. The likelihood of data interruption or loss through dirt accumulation or accidental demagnification, however, plagues these newer cards as much as the older, lower capacity cards, when there is proximity to degaussers used in some industries as recording heads, adjacency to other magnetized cards in a wallet, or chance encountering of commonplace magnets such as those in car starter motors and electric door solenoids or at retail counters. This newer technology will enable some of the larger data capacity applications noted above to become reality, but the problem of vulnerability remains, exacerbated by the greater amount of information possibly lost.

X-Y reading of the increased capacity data storage is problematical. The signal available from the magnetized data is proportional to the relative velocity between the reading head and the data disk, Thus, the need to start and stop the reading head at the end of each row or column will slow velocities and cause low signal amplitudes.

The invention utilizes rewritable CD technology in a card form to achieve the stated benefits. U.S. Pat. No. 4,547,875 to Ohta, U.S. Pat. No. 5,569,038 to Nagashima, U.S. Pat. No. 5,986,997 to Challener, and U.S. Pat. No. 6,016,298 to Fischer teach various optical recording and reading devices and methods, but none treat of credit card size media devices, or X-Y patterning of tracks on such media.

BRIEF SUMMARY OF THE INVENTION

It is an object of the invention, therefore, to provide a credit card-sized data storage and retrieval system in which the data is stored and read optically, using a laser, to have greatly increased storage capacity, and to avoid inadvertent loss of data from accidental demagnetization. It is a further object of the invention to provide an optical card writing and reading system in which the card is stationary and the laser is moved relative thereto, e.g. in an X-Y pattern or on an angular path, or in which the card is moved in an X-Y pattern or rotated below a laser moving in a radial (including parallel to radial) direction or in which the laser is stationary and the card moves.

These and other objects of the invention to become apparent hereinafter are realized in the optical data card and reader system for recording data in which the card has approximately the dimensions of a credit card, the system including a card having a laser readable layer comprising plural tracks of light-detectable indicia arranged in a pattern, and a laser reader adapted to scan the tracks, the laser reader being mounted for scanning the tracks.

In a particular embodiment, the system includes a card having a laser readable layer comprising plural tracks of light-detectable indicia arranged in an X-Y grid, a card mount, and a laser reader adapted to scan the tracks of the card in the card mount, the laser reader being mounted for scanning the tracks in an X-Y pattern.

In this and like embodiments, typically, the card mount is fixed relative to the laser, the laser being shiftable across the card in registration with the X-Y tracks of the grid in scanning relation, or the laser is fixed relative to the card mounted in the card mount, the card mount shifting the card in an X-Y pattern for scanning by the laser.

In a further embodiment, an optical data card and reader system for recording data is provided in which the card has approximately the dimensions of a credit card, the system including a card having a laser readable layer comprising plural tracks of light-detectable indicia arranged in an angular pattern, a card mount, and a laser reader adapted to scan the tracks, the laser reader being mounted for scanning the tracks.

In this and like embodiments, typically, the card mounted in the card mount rotates, the laser being shiftable on a radial path across the card for scanning radially adjacent card tracks, or the card in the card mount is stationary relative to the laser, the laser being shiftable on a circular path for scanning the tracks.

BRIEF DESCRIPTION OF THE SEVERAL VIEWS OF THE DRAWINGS

The invention will be further described in conjunction with the attached drawings in which.

DETAILED DESCRIPTION OF THE INVENTION

Figure 1:
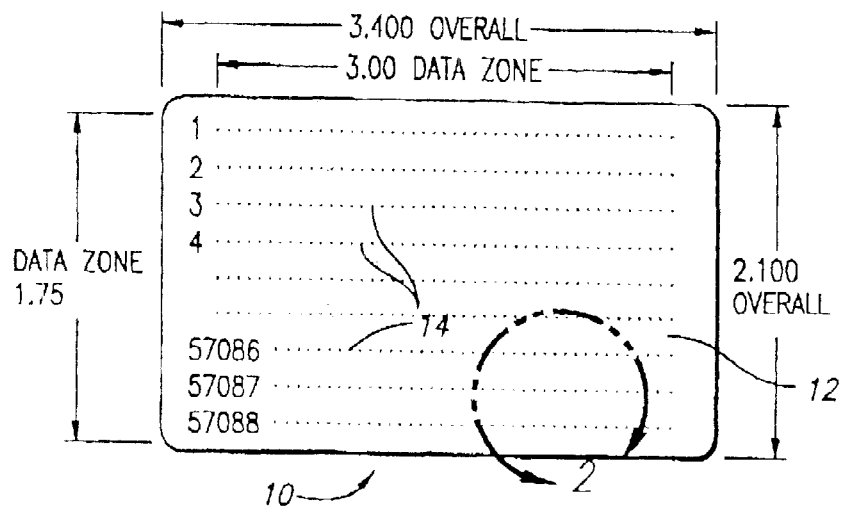
FIG. 1 is a plan view of invention card.
Figure 2:
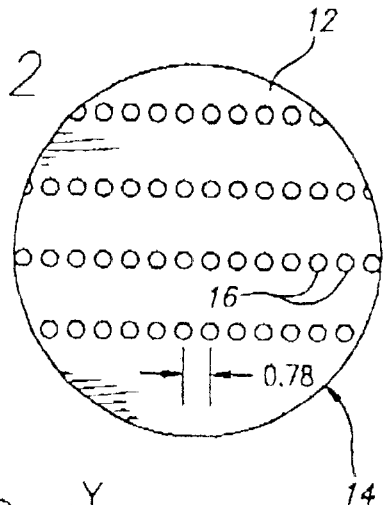
FIG. 2 is a fragmentary detail view of the card showing the data track pattern, taken on line 2 in FIG. 1.

With reference now to the drawings in detail, in FIGS. 1 and 2 the invention data card is shown at 10. The card 10 has approximately the lateral and longitudinal and thickness dimensions of a typical credit card, i.e. about 3.4 inches long and 2.1 inches wide. A data track zone 12 is provided having the approximate dimensions of 3 inches long and 1.75 inches wide. Numerous laser-formed and -readable tracks 14 of light detectable indicia are provided across the data track zone in a predetermined pattern of the X-Y or angular type as hereinafter described.

Figure 3:
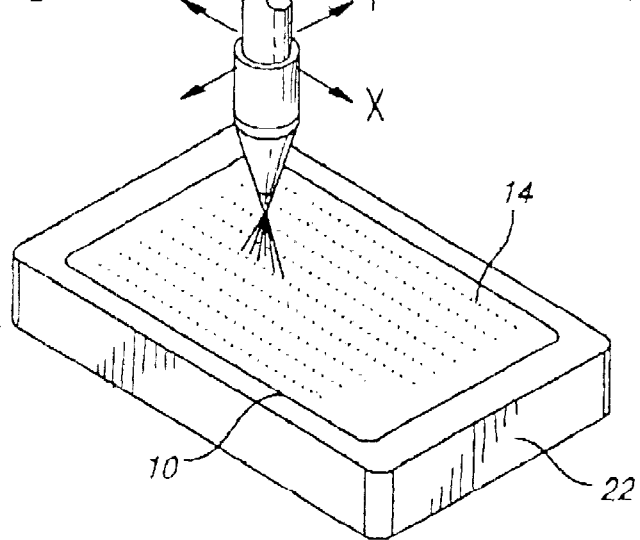
FIG. 3 is a schematic view of a X-Y data track embodiment of the invention in which the card is fixed relative to the movable laser.

In FIGS. 1, 2 and 3, these tracks are of the X-Y type, that is, the tracks are in a grid that consists of parallel longitudinal lines of pits 16 longitudinally separated about 0.78 microns and laterally separated by a space 18. To write on or read the card a laser 20 is passed to a track 14 along a Y axis and then along the length of the track on an X axis, as is known in the art. The card is mounted in a suitable card mount 22 that is fixed in place and that holds the card fixed relative to the laser 20.

Figure 4:
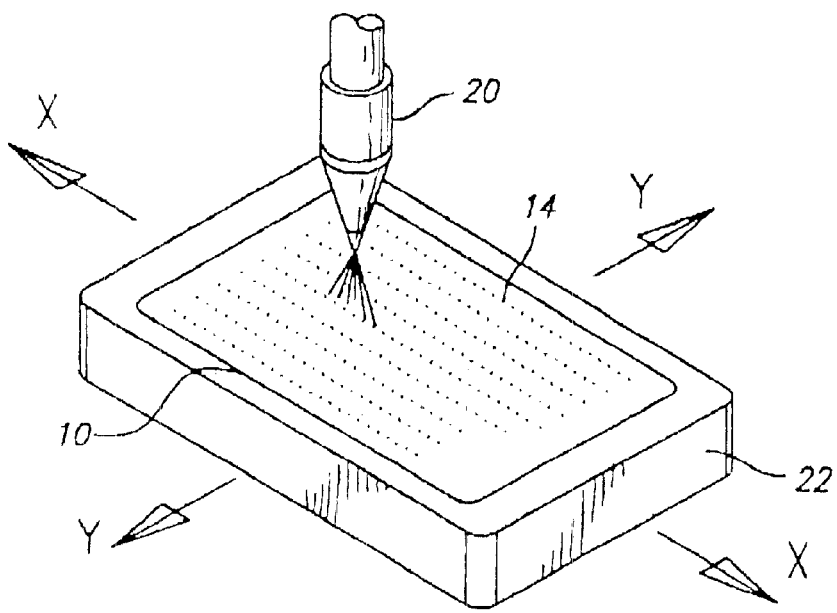
FIG. 4 is a schematic view of a X-Y data track embodiment of the invention in which the laser is fixed relative to the card in a movable mount.

In FIG. 4 an alternative embodiment is shown in which the card mount 22 is movable on X and Y axes as shown, such that the card 10 is carried along the X and Y axes. Laser 20 in this embodiment is fixed.

Figure 5:
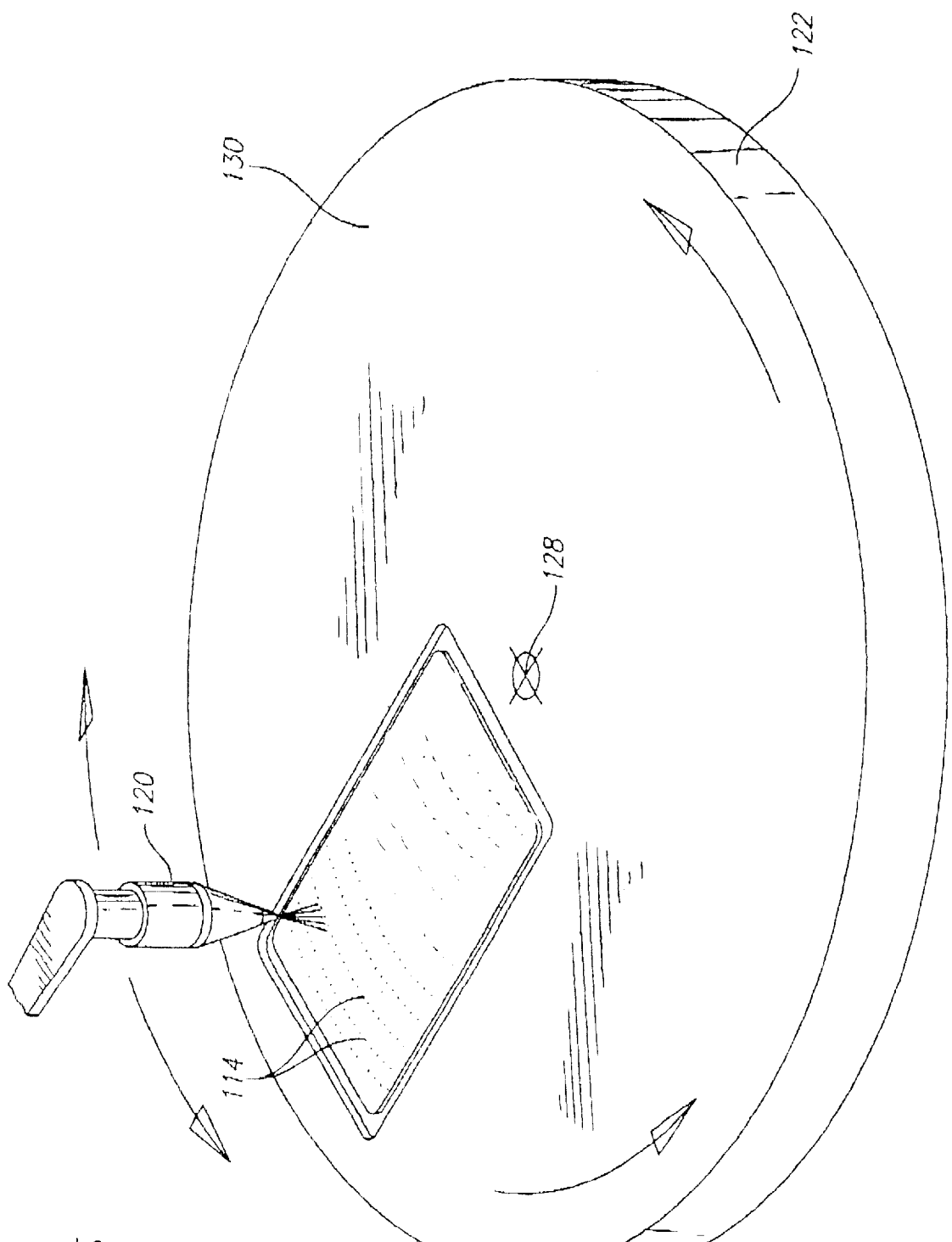
FIG. 5 is a schematic view of an angular track embodiment of the invention in which the laser is fixed and the card is movable in its disk mount; and, FIG. 6 is a schematic view of an angular track embodiment in which the card is fixed in its location, and the laser is shiftable between angular tracks.

In FIG. 5, card 110 is carried in pocket 128 in disk 130 that serves as the mount 122. Card 110 has a series of parallel angular tracks 114 that are centered on a point at the center of the disk 128, or, preferably, on another point outside the disk so as to provide a radius so great that the tracks are only minimally angular and practically straight. Laser 120 is carried on a suitable support (not shown) for movement in a radial (or parallel to radial) path across the tracks 114 for reading and writing to the card 110.

Figure 6:
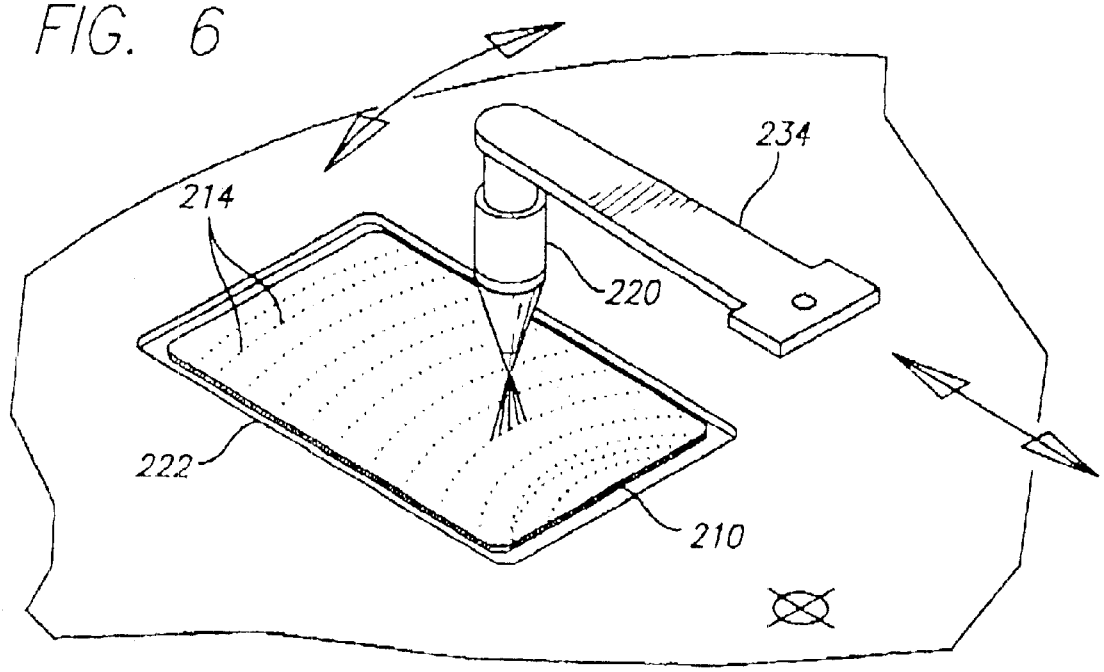

In FIG. 6, a further embodiment is shown in which the card mount 222 is fixed to maintain the card 210 in fixed position. Minimally angular tracks 214 are again provided in the card 210. Laser 220 is carried on a support 234 that has angular and longitudinal movement capabilities for locating the laser at one or another track 214 by carrier movement, and not card 210 movement, The invention thus provides a credit card-sized data storage and retrieval system in which the data is stored and read optically, using a laser, to have greatly increased storage capacity, and to avoid inadvertent loss of data from accidental demagnetization. In accordance with the invention optical card writing and reading system the card is stationary and the laser is moved relative thereto, e.g. in an X-Y pattern or on an angular path, or the card is moved in an X-Y pattern or rotated below a laser moving in a radial (including parallel to radial) direction, or the laser is stationary and the card moves.

The foregoing objects are thus met.

We claim:

1. Optical data card and reader system for recording data in which the card has approximately the dimensions of a credit card, said system including a card having a laser readable layer comprising plural tracks of light-detectable indicia arranged in an X-Y grid, a card mount, and a laser reader adapted to scan said tracks of said card in said card mount, said laser reader being mounted for scanning said tracks in an X-Y pattern, said card in said card mount being fixed relative to said laser, said laser being shiftable across said card in registration with said X-Y tracks of said grid in scanning relation.

2. Optical data card and reader system for recording data in which the card has approximately the dimensions of a credit card, said system including a card having a laser readable layer comprising plural tracks of light-detectable indicia arranged in an X-Y grid, a card mount, and a laser reader adapted to scan said tracks of said card in said card mount, said laser reader being mounted for scanning said tracks in an X-Y pattern, said laser being fixed relative to said card mounted in said card mount, said card mount shifting said card in an X-Y pattern for scanning by said laser.

* * * * *